(12) United States Patent
Phan et al.

(10) Patent No.: US 10,589,681 B2
(45) Date of Patent: Mar. 17, 2020

(54) OUTER MIRROR FOR VEHICLE

(71) Applicant: TOYOTA JIDOSHA KABUSHIKI KAISHA, Toyota-shi, Aichi-ken (JP)

(72) Inventors: Vinh Long Phan, Aichi-gun (JP); Yuta Ito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 15/794,597

(22) Filed: Oct. 26, 2017

(65) Prior Publication Data

US 2018/0178727 A1 Jun. 28, 2018

(30) Foreign Application Priority Data

Dec. 26, 2016 (JP) ................................. 2016-251561

(51) Int. Cl.
*B60R 1/06* (2006.01)
(52) U.S. Cl.
CPC ............ *B60R 1/06* (2013.01); *B60Y 2306/09* (2013.01)
(58) Field of Classification Search
CPC .. B60R 1/06; B60R 1/00; B60R 1/006; B60R 1/02; B60R 2011/0033; B60R 2011/004; B06Y 2306/09

USPC .......................................................... 359/871
See application file for complete search history.

(56) References Cited

U.S. PATENT DOCUMENTS

| 6,712,413 B1 * | 3/2004 | Flowerday ................ B60R 1/06 248/476 |
| 2004/0165267 A1 | 8/2004 | Oishi et al. |
| 2006/0050423 A1 * | 3/2006 | Secanu ..................... B60R 1/06 359/871 |

FOREIGN PATENT DOCUMENTS

| JP | H08-132965 A | 5/1996 |
| JP | 2004-196219 A | 7/2004 |
| JP | 2004-249848 A | 9/2004 |
| JP | 2010-036691 A | 2/2010 |
| WO | WO-2014027587 A1 * | 2/2014 |

* cited by examiner

*Primary Examiner* — Jade R Chwasz
(74) *Attorney, Agent, or Firm* — Oliff PLC

(57) ABSTRACT

An outer mirror for a vehicle according to the technology of the present disclosure includes a mirror stay, a mirror visor, and a mirror for checking behind the vehicle. The mirror stay is provided at a vehicle body side face. The mirror visor is supported by the mirror stay and includes an opening portion at a vehicle rear side. The mirror is provided in the opening portion. In a horizontal section cut through the mirror visor, a distance between a vehicle width direction inner side face of the mirror visor and the vehicle body side face decreases toward the vehicle rear from a front end portion of the mirror visor.

4 Claims, 10 Drawing Sheets

OUTER MIRROR FOR VEHICLE

CROSS-REFERENCE TO RELATED APPLICATION

This application claims priority under 35 USC 119 from Japanese Patent Application No. 2016-251561 filed Dec. 26, 2016, the disclosure of which is incorporated by reference herein.

BACKGROUND

Technical Field

The technology of the present disclosure relates to an outer mirror for a vehicle.

Related Art

A structure of an outer mirror for a vehicle has been disclosed (see Japanese Patent Application Laid-Open (JP-A) No. 2004-249848) in which a side face at a vehicle width direction inner side of a mirror housing (a mirror visor) is parallel with a side door glass opposing the side face.

However, in the conventional example mentioned above, a wind progressing toward the vehicle rear enters into a gap between the mirror visor and the side glass opposing the mirror visor. As a result, the wind speed increases, and it may not be possible to reduce transmitted noise that is transmitted through the side glass into a passenger compartment.

SUMMARY

An embodiment of the present disclosure provides an outer mirror for a vehicle that moderates a noise source that is a source of transmitted noise through a vehicle body side face into a passenger compartment.

An outer mirror for a vehicle according to a first aspect includes: a mirror stay provided at a vehicle body side face; a mirror visor that is supported by the mirror stay and includes an opening portion at a vehicle rear side; and a mirror for checking behind the vehicle that is provided at the opening portion, wherein, in a horizontal section cut through the mirror visor, a distance between a vehicle width direction inner side face of the mirror visor and the vehicle body side face decreases toward the vehicle rear from a front end portion of the mirror visor.

BRIEF DESCRIPTION OF THE DRAWINGS

Exemplary embodiments of the present disclosure will be described in detail based on the following figures, wherein.

DETAILED DESCRIPTION

Figure 1:
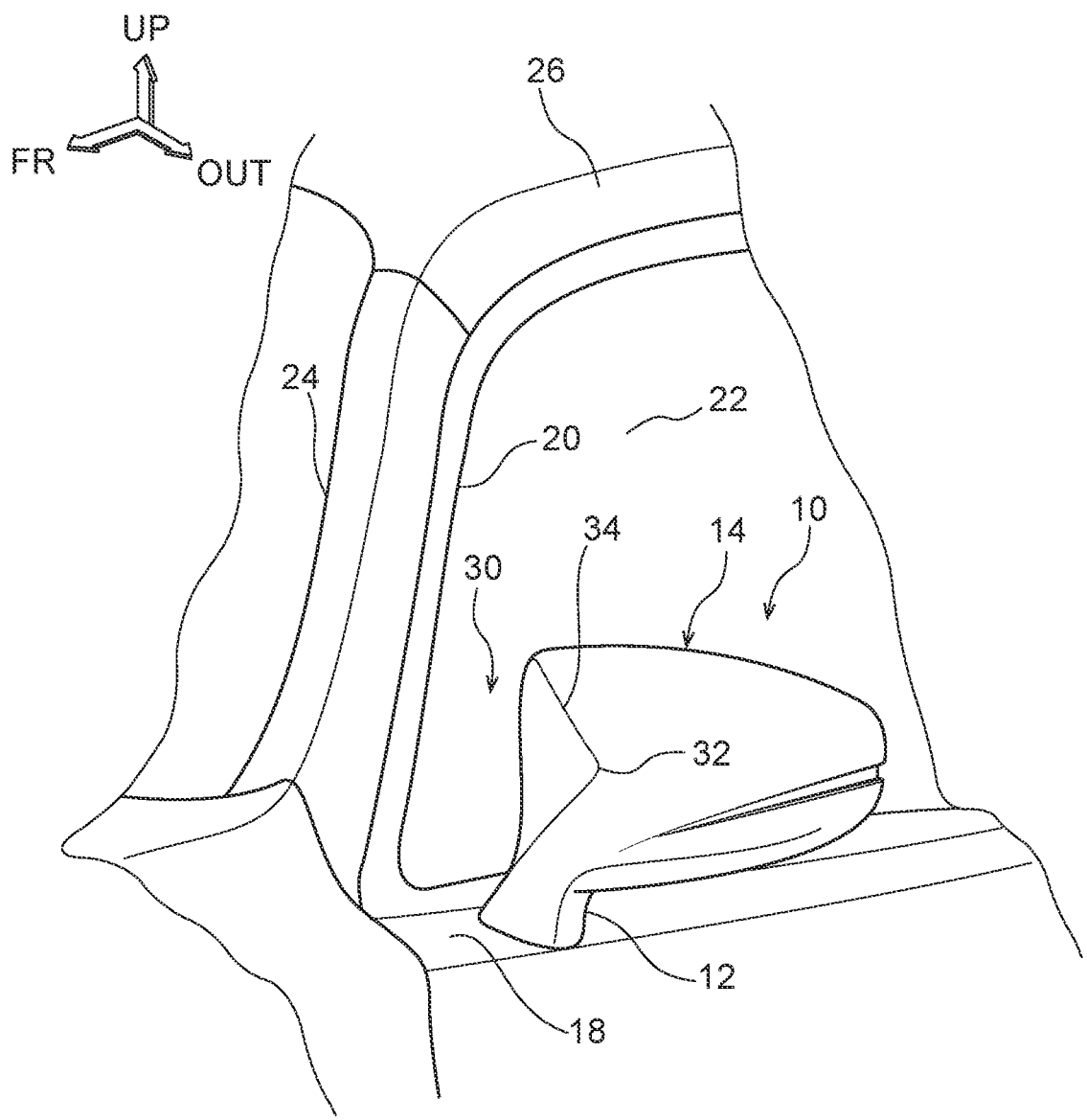
FIG. 1 is a perspective view showing an outer mirror for a vehicle according to a present exemplary embodiment.

Herebelow, a mode for embodying the technology of the present disclosure is described in accordance with the drawings. In the drawings, the arrow FR indicates a vehicle front side, the arrow UP indicates the vehicle upper side, the arrow RH indicates the vehicle right side, the arrow IN indicates a vehicle width direction inner side, and the arrow OUT indicates the vehicle width direction outer side.

Figure 2:
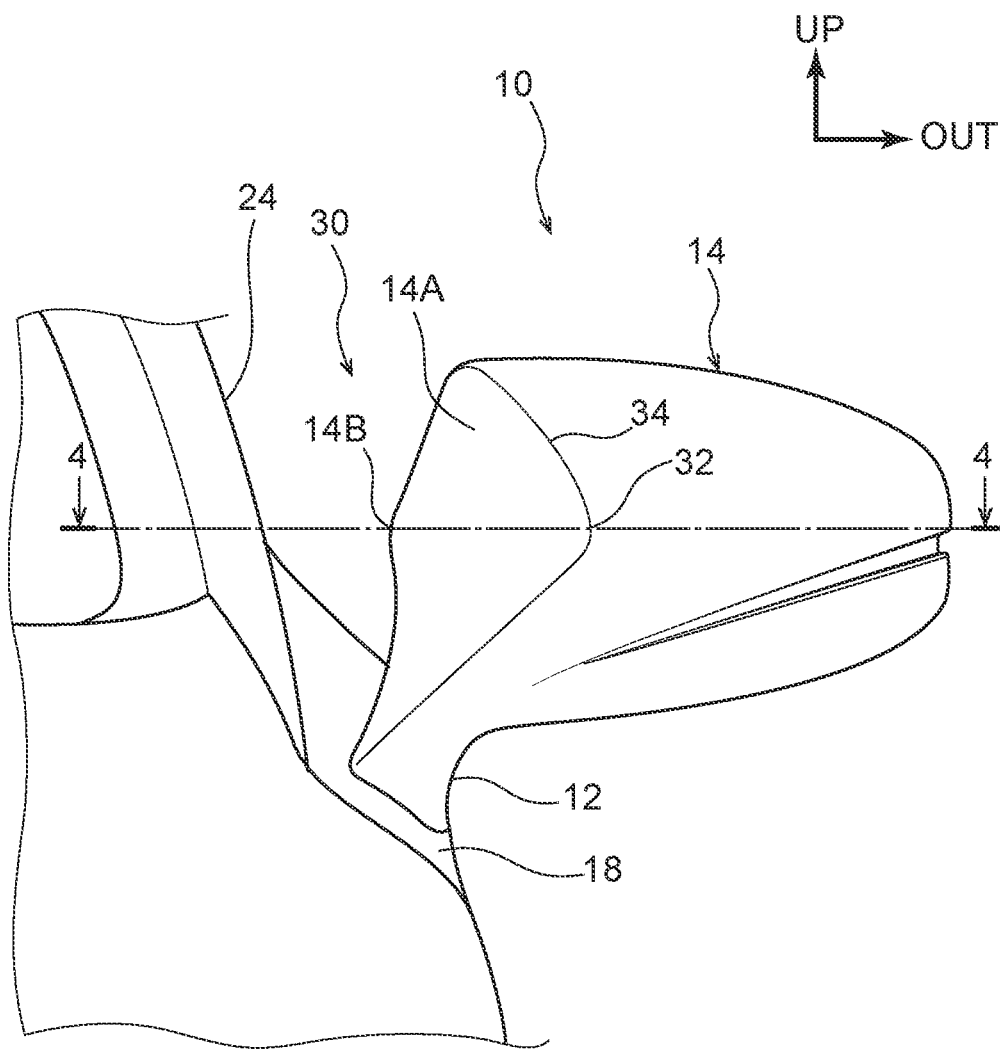
FIG. 2 is a front view showing the outer mirror for a vehicle according to the present exemplary embodiment.
Figure 3:
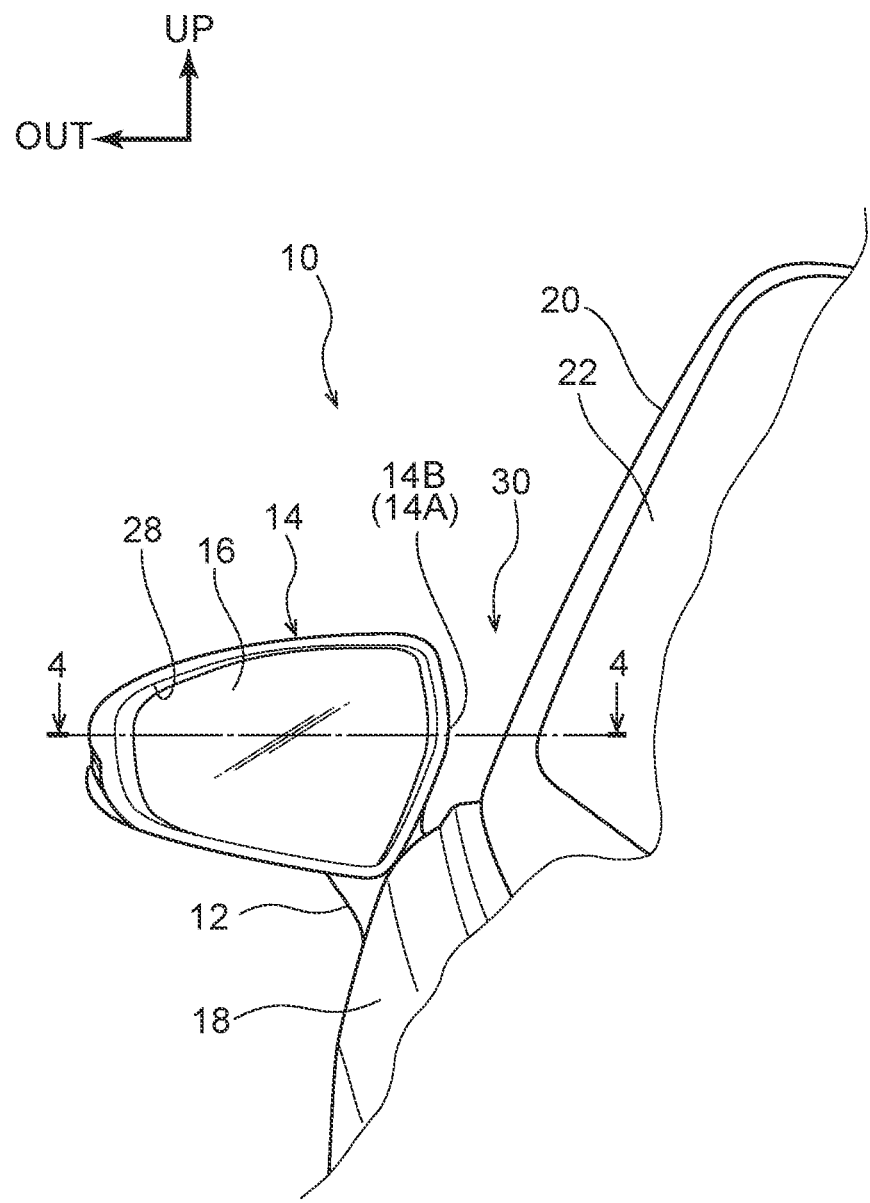
FIG. 3 is a rear view showing the outer mirror for a vehicle according to the present exemplary embodiment.

In FIG. 1 to FIG. 3, a vehicle outer mirror 10 according to a present exemplary embodiment is a door mirror that is provided at a door panel 18, which serves as an example of a vehicle body side face. The vehicle outer mirror 10 includes a mirror stay 12, a mirror visor 14, and a mirror 16 for checking behind the vehicle.

The mirror stay 12 is provided at, for example, a vehicle front side end portion of an upper edge of the door panel 18. The mirror stay 12 is a strut that protrudes diagonally upward to the vehicle outer side of the door panel 18. A glass molding 20 in, for example, an arch shape (an inverted "U" shape) is provided at the vehicle upper side of the door panel 18. A side glass 22 is disposed in a region enclosed by this glass molding 20. The glass molding 20 is shaped to run along a front pillar 24 and a roof side rail 26.

The mirror visor 14 is supported by the mirror stay 12. The mirror visor 14 includes an opening portion 28 at the vehicle rear side thereof (see FIG. 3 and FIG. 4). The mirror 16 (a reflective mirror) is provided in the opening portion 28. That is, the mirror visor 14 protects the mirror 16 from wind. As shown in FIG. 3, a dimension of the opening portion 28 in the vehicle vertical direction is specified to be larger at the vehicle width direction inner side than at the vehicle width direction outer side.

In FIG. 2, a V-gap portion 30, which is a gap in a substantial "V" shape, is formed by a vehicle width direction inner side face 14A of the mirror visor 14 and the side glass 22 that serves as the vehicle body side face (see FIG. 1). As shown by the example in FIG. 4, in a horizontal section cut through the mirror visor 14, a distance L between the inner side face 14A of the mirror visor 14 and the side glass 22 decreases toward the vehicle rear from a front end portion 32 of the mirror visor 14. In other words, at the position of the section of FIG. 4, the width of the V-gap portion 30 corresponding to the distance L is largest at an entry 30A, at which the front end portion 32 of the mirror visor 14 is disposed, and decreases generally monotonically toward an exit 30B, at which a rear end 14B of the inner side face 14A of the mirror visor 14 is disposed. Thus, the V-gap portion 30 between the mirror visor 14 and the side glass 22 is formed in a flow-contracting shape. The position of the section of FIG. 4 is at a vehicle vertical direction central portion of the mirror visor 14 and corresponds to the position of the arrows 4-4 in FIG. 2 and FIG. 3.

Figure 4:
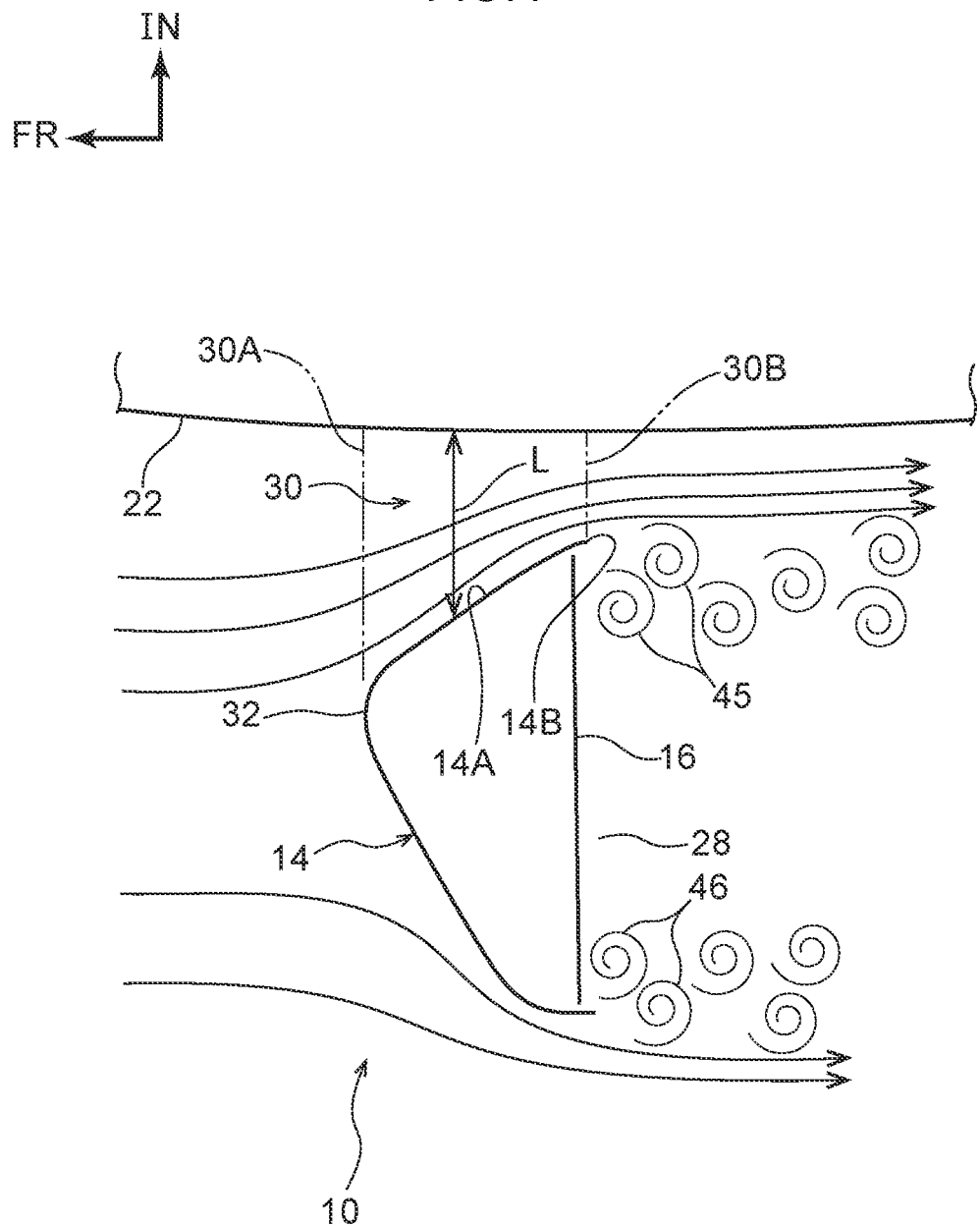
FIG. 4 is a sectional view cut along line 4-4 in FIG. 2 and FIG. 3, showing flows of air around the outer mirror for a vehicle according to the present exemplary embodiment.

As shown by the example in FIG. 2 and FIG. 4, the front end portion 32 of the mirror visor 14 is provided at, for example, the vehicle width direction inner side relative to a vehicle width direction central portion of the mirror visor 14. In the example, at the position of the section of FIG. 4, the front end portion 32 is disposed at a location approximately a third of the width of the mirror visor 14 toward the vehicle width direction outer side from the vehicle width direction inner side of the mirror visor 14.

As shown by the example in FIG. 1 and FIG. 2, a ridgeline 34 of the front end portion 32 of the mirror visor 14 is continuous in the vehicle vertical direction. The ridgeline 34 extends to the vehicle width direction inner side toward the vehicle upper side from the vehicle vertical direction central portion of the mirror visor 14, and extends to the vehicle width direction inner side toward the vehicle lower side from the vehicle vertical direction central portion of the mirror visor 14. In other words, vehicle width direction positions of the front end portion 32 of the mirror visor 14 vary with positions in the vehicle vertical direction. The range of these variations is contained in, for example, a range at the vehicle width direction inner side relative to the vehicle width direction central portion of the mirror visor 14. Thus, the ridgeline 34 is formed in a "V" shape. The ridgeline 34 serves as a boundary between the vehicle width direction inner side face 14A of the mirror visor 14 and other surfaces of the mirror visor 14. Because the ridgeline 34 is formed in the "V" shape, the vehicle width direction inner side face 14A of the mirror visor 14 is formed substantially in a triangular shape. The ridgeline 34 is formed to continue along the mirror stay 12 too.

As shown by the example in FIG. 2 and FIG. 3, the rear end 14B of the vehicle width direction inner side face 14A of the mirror visor 14 extends to the vehicle width direction outer side toward both the vehicle upper side and the vehicle lower side from the vehicle vertical direction central portion. That is, the rear end 14B of the inner side face 14A is disposed furthest to the vehicle width direction inner side at the vehicle vertical direction central portion. In other words, the rear end 14B is formed in a horizontal "V" shape that protrudes to the vehicle width direction inner side.

In mirror design, a distance L between the vehicle width direction inner side face 14A of the mirror visor 14 and the side glass 22 (a representative distance) is measured by reference to the shortest distance between the mirror visor 14 and the side glass 22 in a section taken at the center of the mirror visor 14 in the vehicle vertical direction. When the mirror visor 14 has a flow-contracting shape as in the present exemplary embodiment, the distance L between the mirror visor 14 and the side glass 22 (see FIG. 4) is shortest at the vehicle vertical direction central portion of the rear end 14B.

Given matching conditions for representative distance between the mirror visor 14 and the side glass 22, forming the rear end 14B in a horizontal "V" shape as in the present exemplary embodiment may improve wind noise performance compared to forming the rear end 14B in a linear shape in the vehicle vertical direction. This is because turbulence (a noise source) in air currents at the rear side of the mirror visor 14 that is produced from the rear end 14B of the mirror visor 14 is further from the side glass 22 on average over the vehicle vertical direction.

Moreover, the strength of turbulence in air currents at the rear side of the mirror visor 14 (mirror rear flows) that is produced from the rear end 14B depends on the shape of the rear end 14B. When the rear end 14B is in a sideways "V" shape as in the present exemplary embodiment, phase alignment in the vehicle vertical direction of turbulence in mirror rear flows is less likely than if the rear end 14B were in a linear shape. This leads to a reduction in the strength of turbulence in mirror rear flows (and in the strength of the noise source).

—Operation—

The present exemplary embodiment is structured as described above; operations are described below together with analysis results and testing results. In the vehicle outer mirror 10 according to the present exemplary embodiment in FIG. 4, the distance L between the inner side face 14A of the mirror visor 14 and the side glass 22 decreases toward the vehicle rear from the front end portion 32 of the mirror visor 14. That is, the V-gap portion 30 between the mirror visor 14 and the side glass 22 is formed in the flow-contracting shape. Therefore, form resistance of the V-gap portion 30 is greater than in a structure in which the distance between the inner side face of a mirror visor and a vehicle body side face increases toward the vehicle rear (which structure is below referred to simply as "the conventional example").

Figure 5:
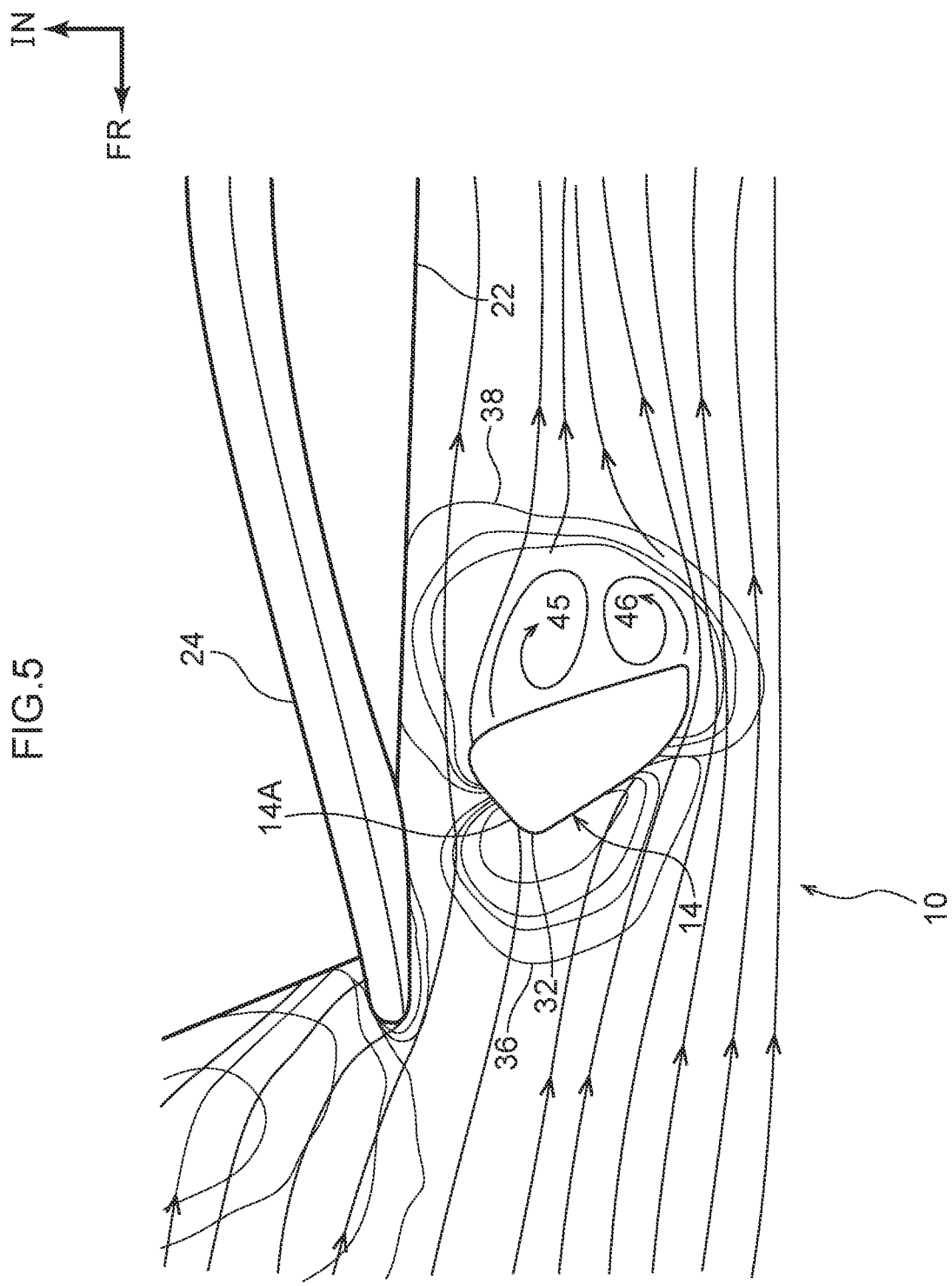
FIG. 5 is a computational fluid dynamics (CFD) analysis diagram showing, in a vehicle plan view, a pressure distribution around the outer mirror for a vehicle according to the present exemplary embodiment.

Thus, when wind progressing toward the vehicle rear comes up against the mirror visor 14 during vehicle running, as illustrated in FIG. 5, pressure at the front side of the mirror visor 14 rises. In FIG. 5, the reference symbols 36 and 38 indicate pressure distributions. Pressure is higher at the inner side of the pressure distribution with the reference symbol 36, and pressure is higher at the inner side of the pressure distribution with the reference symbol 38. The closer an angle of the surface of the mirror visor 14 is to the perpendicular with respect to the wind, the higher the pressure. FIG. 5 to FIG. 8 show results of analysis using computational fluid dynamics (CFD).

Figure 6:
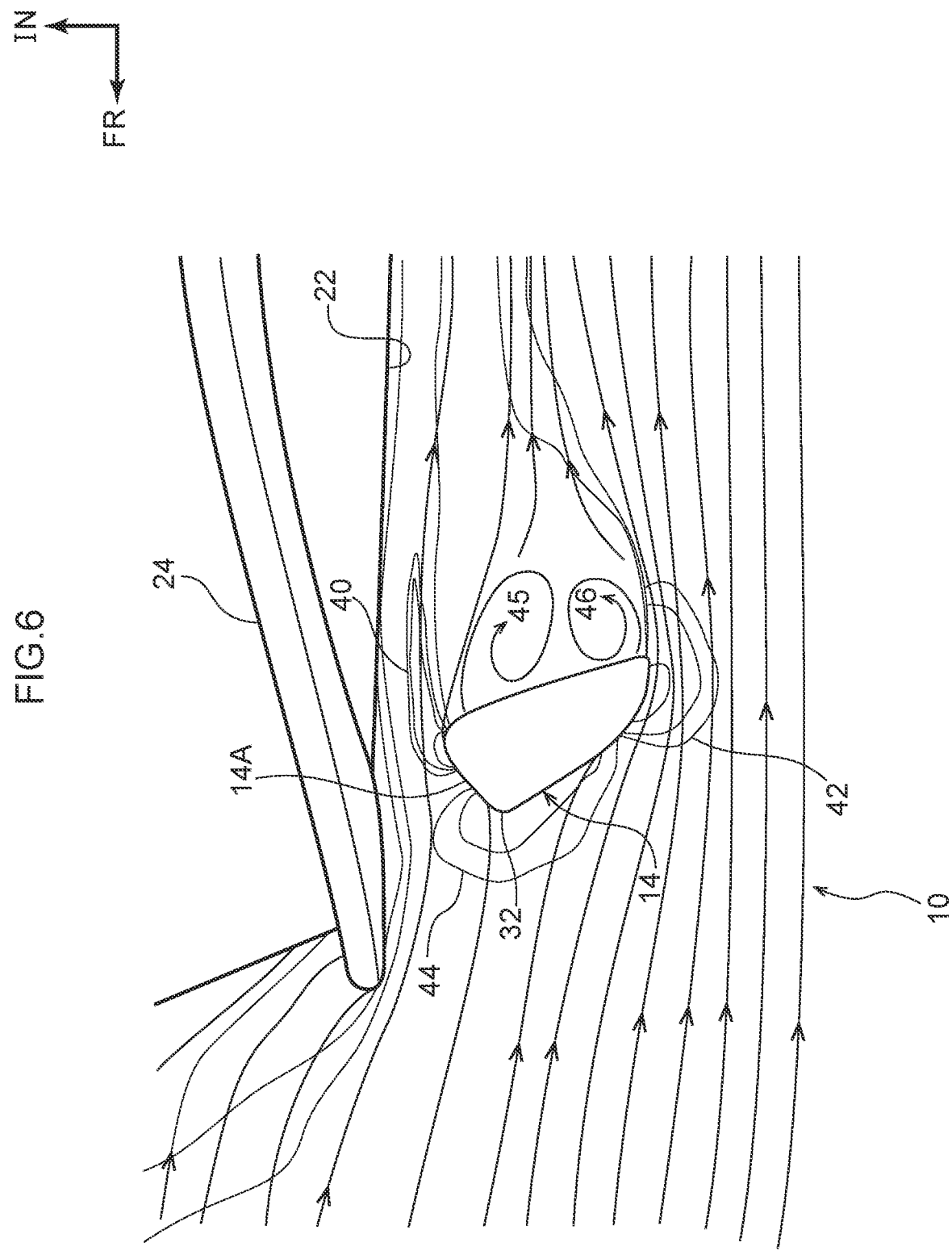
FIG. 6 is a CFD analysis diagram showing, in a vehicle plan view, a wind speed distribution around the outer mirror for a vehicle according to the present exemplary embodiment.

Because the pressure is raised, a wind speed of wind flowing into the V-gap portion 30 between the mirror visor 14 and the side glass 22 that is the vehicle body side face is slowed, as shown in FIG. 6. This is based on Bernoulli's principle, according to which, if p represents pressure and u represents wind speed, $p+u^2=a$ constant. According to this principle, the larger the pressure p, the lower the wind speed u. In FIG. 6, the reference symbols 40, 42 and 44 indicate wind speed distributions. The reference symbol 40 indicates a wind speed distribution at the vehicle width direction inner side of the mirror visor 14, the reference symbol 42 indicates a wind speed distribution at the vehicle width direction outer side of the mirror visor 14, and the reference symbol 44 indicates a wind speed distribution at the front side of the mirror visor 14. The wind speed is lower at the inner side of the wind speed distribution 44.

The wind speed is higher at the inner sides of both the wind speed distributions 40 and 42. Speeds in regions at innermost sides are equivalent. A region at the innermost side of the wind speed distribution 40 is smaller than a region at the innermost side of the wind speed distribution 42. Therefore, it can be seen that a region with high wind speed is smaller at the vehicle width direction inner side of the mirror visor 14.

In the present exemplary embodiment, the front end portion 32 of the mirror visor 14 is provided at the vehicle width direction inner side relative to the vehicle width direction central portion of the mirror visor 14. Therefore, an amount of wind directed toward the vehicle width direction outer side of the mirror visor 14 is increased and an amount of wind flowing into the V-gap portion 30 between the mirror visor 14 and the vehicle body side face is reduced.

The ridgeline 34 of the front end portion 32 of the mirror visor 14 extends to the vehicle width direction inner side toward the vehicle upper side from the vehicle vertical direction central portion of the mirror visor 14 and also extends to the vehicle width direction inner side toward the vehicle lower side from the vehicle vertical direction central portion of the mirror visor 14. As a result, wind flowing into the V-gap portion 30 between the mirror visor 14 and the side glass 22 from the front end portion 32 of the mirror visor 14 is dispersed in the vehicle vertical direction. Consequently, a local increase in wind speed of the wind flowing into the V-gap portion 30 may be suppressed.

Figure 7:
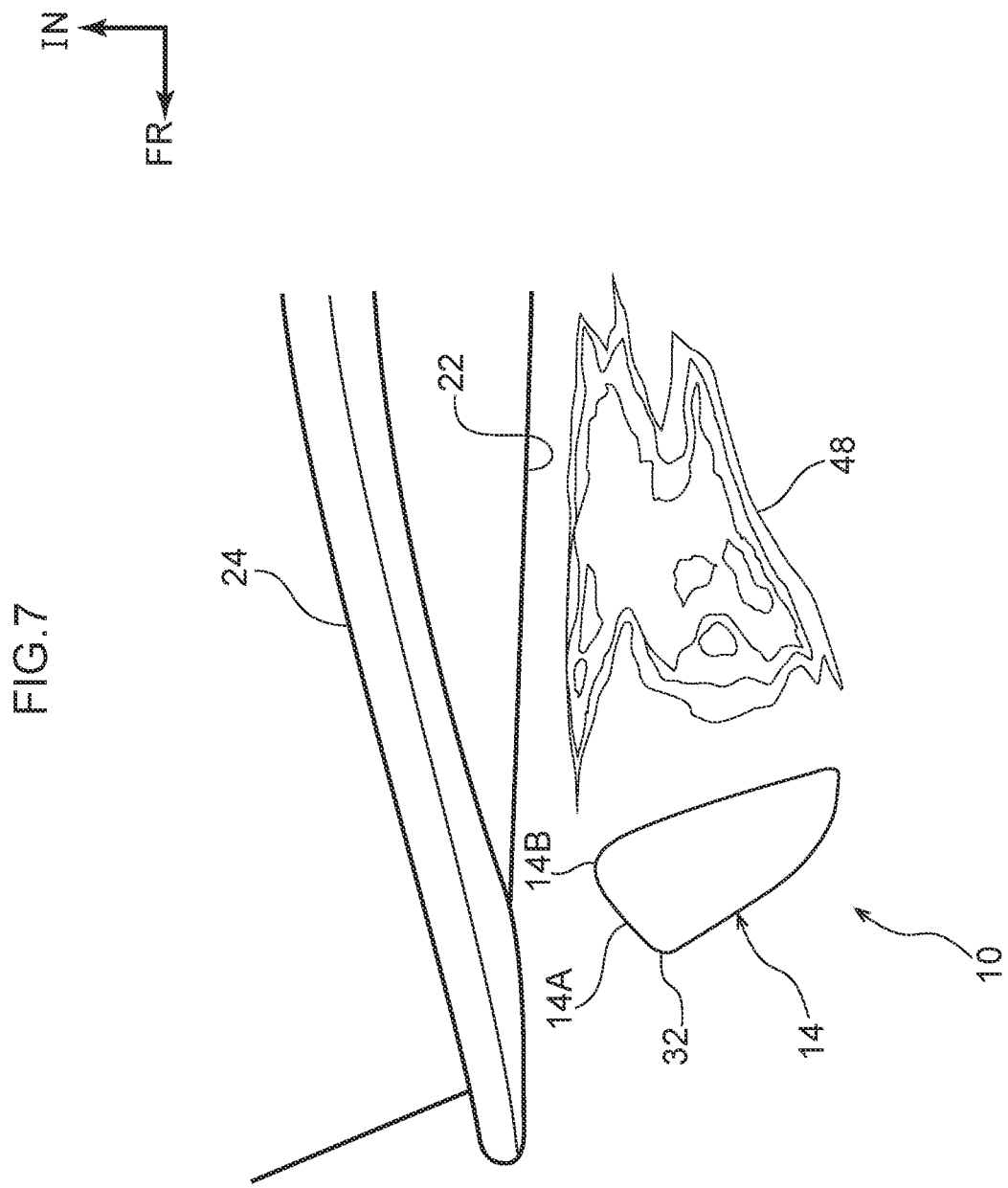
FIG. 7 is a CFD analysis diagram showing, in a vehicle plan view, standard deviations of speed around the outer mirror for a vehicle according to the present exemplary embodiment.

Thus, the wind speed u of wind in the V-gap portion 30 is smaller. Therefore, eddies 45 that are produced at the rear side of the inner side face 14A of the mirror visor 14 are smaller, similarly to eddies 46 that are produced at the rear side of the vehicle width direction outer side of the mirror visor 14 (FIG. 4 to FIG. 6). As a result, turbulence at the rear side of the mirror visor 14 (and the strength of the noise source) is reduced. In FIG. 7, a distribution 48 of standard deviations of wind speed is shown. Differences between the inner side and the outer side are small, and turbulence is reduced compared to the conventional example. These eddies 45 and 46 are, for example, Karman vortices.

If a wind speed of wind in a V-gap portion of the conventional example is represented by U, then u<U. Regarding a distance between the noise source (the eddies 45) at the rear end 14B of the inner side face 14A and the side glass 22, if the distance is represented by r in the present exemplary embodiment and is represented by R in the conventional example, then r<R. Thus, the noise source is closer to the side glass 22 in the present exemplary embodiment than in the conventional example. However, because the wind speed is reduced from U to u, transmitted noise that is transmitted through the side glass 22 and intrudes into the passenger compartment may be reduced. To be more specific, a proportional reduction in noise intensity of transmitted noise (the sixth power of wind speed) due to the reduction in wind speed at the V-gap portion 30 (u<U) outweighs a proportional increase in the noise intensity of transmitted noise (the second power of distance) caused by the reduction in distance (r<R). Therefore, a reduction in fluid dynamic noise that is transmitted through the side glass 22 may be achieved.

The noise intensity of the transmitted noise is proportional to (sixth power of wind speed)/(second power of distance). Therefore, the following equation (1) applies. By rearrangement, equation (1) may be expressed as equation (2).

$$u^6/r^2 < U^6/R^2 \quad (1)$$

$$u^6/U^6 < r^2/R^2 \quad (2)$$

Figure 8:
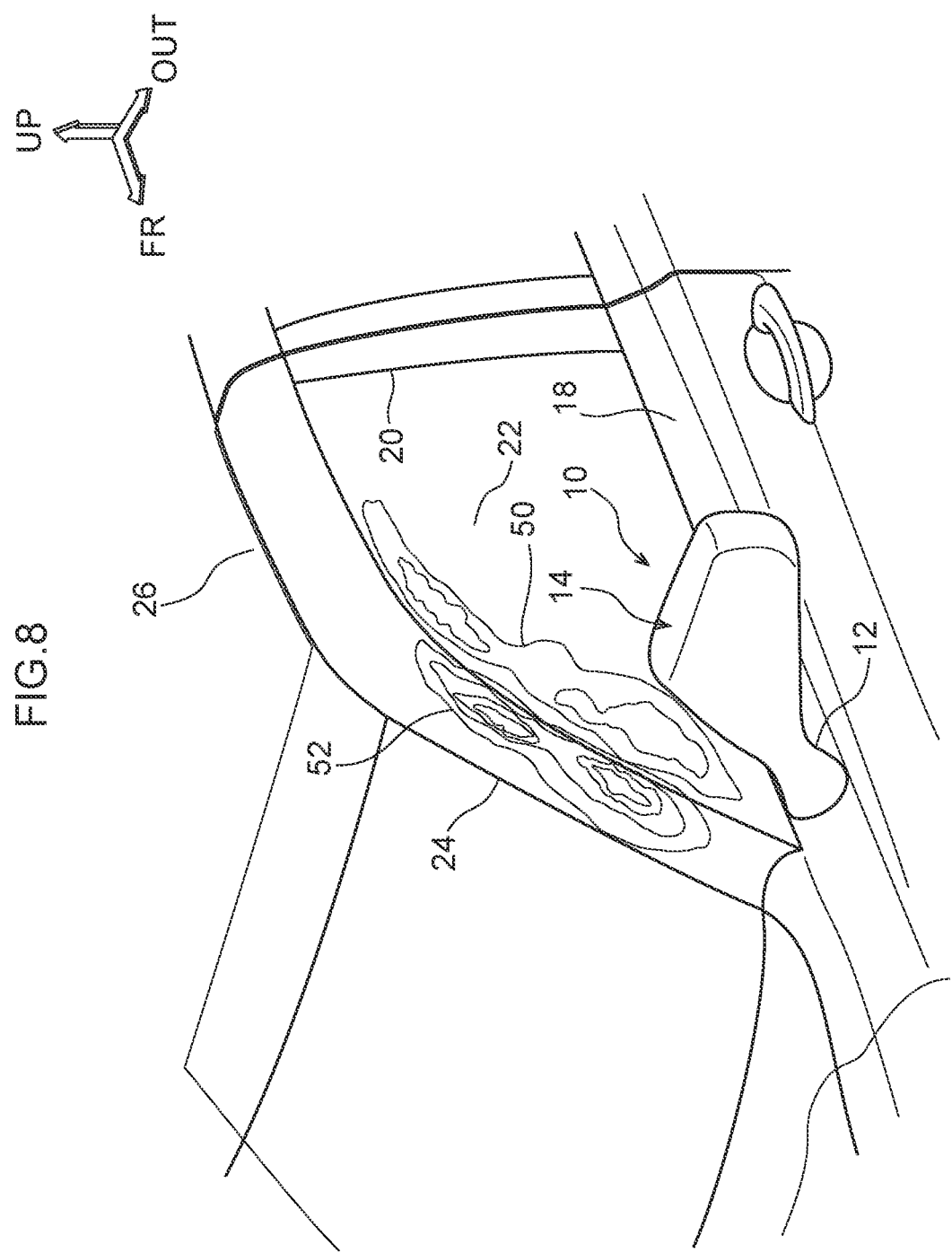
FIG. 8 is a CFD analysis diagram showing a power distribution of vehicle exterior noise around the outer mirror for a vehicle according to the present exemplary embodiment.

FIG. 8 shows vehicle exterior noise power distributions 50 and 52. The vehicle exterior noise power distribution 50 refers to a vicinity of the side glass 22 and the vehicle exterior noise power distribution 52 refers to a vicinity of the front pillar 24. Vehicle exterior noise power is a physical quantity representing the strength of noise, which represents noise intensity passing through a unit of area. The unit of measurement of vehicle exterior noise power is W/m². The vehicle exterior noise power is a value representing a total energy of noise (wind noise) radiating from the surface of a vehicle model, and corresponds to an integral of the vehicle exterior noise power distribution 50. In FIG. 8, the vehicle exterior noise power distributions 50 and 52 are larger in regions closer to the inner sides thereof. It is apparent that the vehicle exterior noise power distribution 50 in the vicinity of the side glass 22 is reduced compared to the conventional example and that the noise intensity is reduced.

Figure 9:
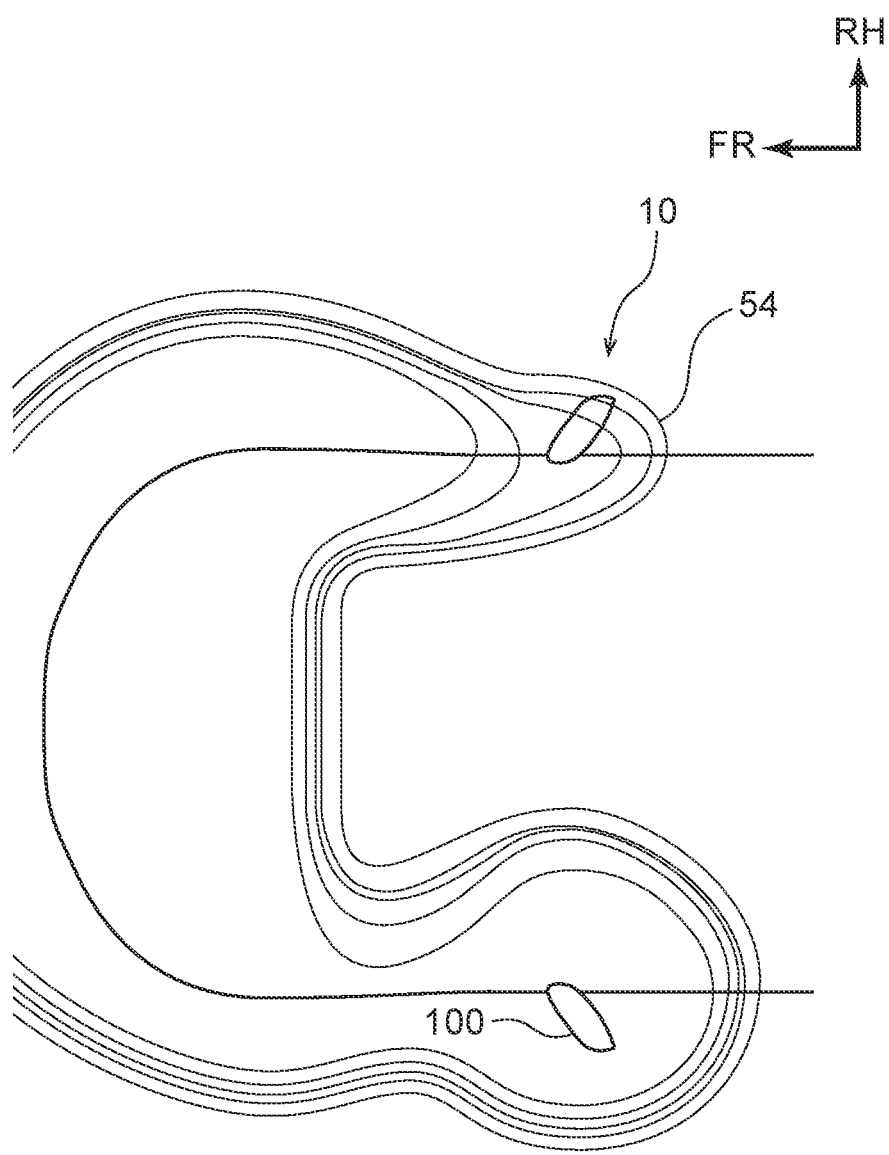
FIG. 9 is a plan view showing a distribution of acoustic intensity around the outer mirror for a vehicle according to the present exemplary embodiment, which is found by wind tunnel testing.

FIG. 9 shows a distribution 54 of noise intensity around the vehicle outer mirror 10 according to the present exemplary embodiment, calculated from wind tunnel testing (top array measurements). Here, the vehicle outer mirror 10 according to the present exemplary embodiment is provided at the vehicle right side of a model, and a vehicle outer mirror 100 according to the conventional example is provided at the vehicle left side. The wind speed is 120 km/h and the frequency band is 2 kHz. At the vehicle outer mirror 10 according to the present exemplary embodiment, it can be seen that the noise intensity in the vicinity of the mirror is reduced compared to the vehicle outer mirror 100 according to the conventional example.

Figure 10:
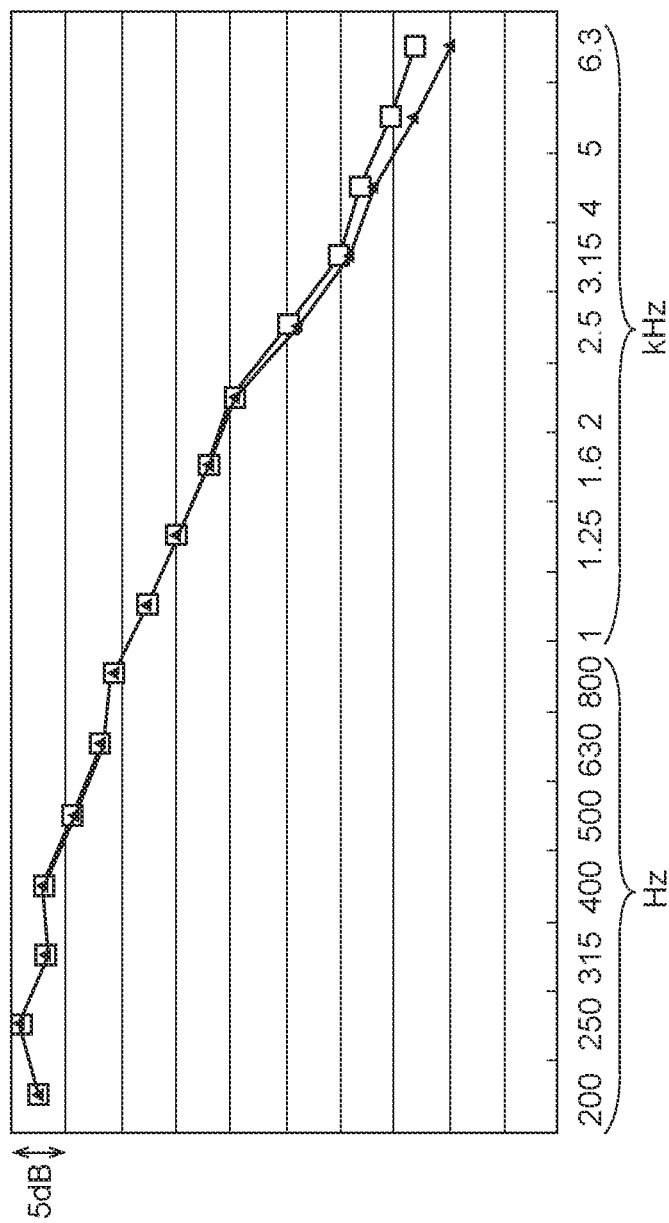
FIG. 10 is a graph showing results of measurements of acoustic pressure at an ear position of a vehicle occupant, which are found by practical running testing.

FIG. 10 shows results of measurements of acoustic pressure at the position of an ear of a vehicle occupant (noise inside the passenger compartment) in a practical running test at a vehicle speed of 120 km/h. The horizontal axis shows central frequencies of respective frequency bands (third-octave bands), and the vertical axis shows acoustic pressures (dB(A)) at the ear position. The triangle marks show results according to the present exemplary embodiment and the square marks show results according to the conventional example. In FIG. 10, the acoustic pressure at the ear position is reduced at high frequencies of 2 kHz and above, and a noise reduction effect caused by the structure of the present exemplary embodiment can be verified.

In the present exemplary embodiment, as described above, a noise source that is a source of noise transmitted into a passenger compartment through the side glass 22 that is a vehicle body side face may be moderated. That is, noise coming from the noise source may be reduced.

ALTERNATIVE EMBODIMENTS

An example of an exemplary embodiment of the technology of the present disclosure is described hereabove, but embodiments of the technology of the present disclosure are not limited to the above. It will be clear that numerous modifications outside the above descriptions may be embodied within a scope not departing from the gist of the present disclosure.

In the above exemplary embodiment, the front end portion 32 of the mirror visor 14 is provided at the vehicle width direction inner side relative to the vehicle width direction central portion of the mirror visor 14, but this is not limiting. The front end portion 32 of the mirror visor 14 may be provided at the vehicle width direction central portion of the mirror visor 14, and may be provided at the vehicle width direction outer side relative to the vehicle width direction central portion.

The ridgeline 34 of the front end portion 32 that is continuous in the vehicle vertical direction extends to the vehicle width direction inner side toward the vehicle upper side from the vehicle vertical direction central portion of the mirror visor 14 and extends to the vehicle width direction inner side toward the vehicle lower side from the vehicle vertical direction central portion of the mirror visor 14, but this is not limiting. The shape of the ridgeline 34 is arbitrary, and structures are possible in which the ridgeline 34 is not provided at the mirror visor 14.

All references, patent applications and technical specifications cited in the present specification are incorporated by reference into the present specification to the same extent as if the individual references, patent applications and technical specifications were specifically and individually recited as being incorporated by reference.

An embodiment of the present disclosure provides an outer mirror for a vehicle that moderates a noise source that is a source of transmitted noise through a vehicle body side face into a passenger compartment.

An outer mirror for a vehicle according to a first aspect includes: a mirror stay provided at a vehicle body side face; a mirror visor that is supported by the mirror stay and includes an opening portion at a vehicle rear side; and a mirror for checking behind the vehicle that is provided at the opening portion, wherein, in a horizontal section cut through the mirror visor, a distance between a vehicle width direction inner side face of the mirror visor and the vehicle body side face decreases toward the vehicle rear from a front end portion of the mirror visor.

During vehicle running with this outer mirror for a vehicle, wind progressing toward the vehicle rear comes up against the mirror visor. Thus, pressure at the front side of the mirror visor rises and the wind speed of wind flowing between the mirror visor and the vehicle body side face falls. As a result, eddies produced at the rear side of the vehicle width direction inner side face of the outer mirror are smaller.

In a second aspect, in the outer mirror for a vehicle according to the first aspect, the front end portion is provided at the vehicle width direction inner side relative to a vehicle width direction central portion of the mirror visor.

In this outer mirror for a vehicle, because the front end portion of the mirror visor is provided at the vehicle width direction inner side relative to the vehicle width direction central portion of the mirror visor, an amount of wind directed toward the vehicle width direction outer side of the mirror visor is increased and an amount of wind flowing in between the mirror visor and the vehicle body side face is reduced.

In a third aspect, in the outer mirror for a vehicle according to the first aspect or the second aspect, a ridgeline of the front end portion that is continuous in a vehicle vertical direction extends to the vehicle width direction inner side toward the vehicle upper side from a vehicle vertical direction central portion of the mirror visor and extends to the vehicle width direction inner side toward the vehicle lower side from the vehicle vertical direction central portion of the mirror visor.

In this outer mirror for a vehicle, because the front end portion of the mirror visor is formed with the ridgeline that continues in the vehicle vertical direction as described above, wind flowing in between the mirror visor and the vehicle body side face from the front end portion of the mirror visor is dispersed in the vehicle vertical direction.

According to the outer mirror for a vehicle according to the first aspect, a noise source that is a source of transmitted noise through a vehicle body side face into a passenger compartment may be moderated.

According to the outer mirror for a vehicle according to the second aspect, the noise source that is a source of transmitted noise through the vehicle body side face into the passenger compartment may be moderated further.

According to the outer mirror for a vehicle according to the third aspect, a local increase in wind speed of the wind flowing between the mirror visor and the vehicle body side face may be suppressed.

What is claimed is:

1. An outer mirror for a vehicle, the mirror comprising:
a mirror stay provided at a vehicle body side face;
a mirror visor that is supported by the mirror stay and includes an opening portion at a vehicle rear side; and
a mirror for checking behind the vehicle that is provided at the opening portion, wherein:
in a horizontal section view that cuts the mirror visor at a vehicle vertical height so as to pass through a front end portion of the mirror visor, the front end portion being a portion of the mirror visor that is closest to a vehicle front side, a distance between (i) a first virtual line that extends along a vehicle width direction inner side face of the mirror visor and extends toward the vehicle body side face from the front end portion and (ii) a second virtual line that extends along the vehicle body side face decreases as the first virtual line goes toward the vehicle rear from the front end portion, the first virtual line and the second virtual line forming a V-shaped gap between the first virtual line and the second virtual line;
a raised ridgeline of the front end portion, the raised ridgeline being continuous in a vehicle vertical direction, (i) extends toward a vehicle width direction inner side on progression from a vehicle vertical direction central portion, to a vehicle upper side, of the mirror visor, (ii) extends toward the vehicle width direction inner side on progression from the vehicle vertical direction central portion, to a vehicle lower side, of the mirror visor, and (iii) is V-shaped; and
the inner side face of the mirror visor has a triangular shape.

2. The outer mirror for a vehicle of claim 1, wherein the front end portion is provided at a vehicle width direction inner side relative to a vehicle width direction central portion of the mirror visor.

3. The outer mirror for a vehicle of claim 2, wherein the front end portion is positioned at a location that is a third of the width of the mirror visor toward a vehicle width direction outer side from the vehicle width direction inner side of the mirror visor.

4. The outer mirror for a vehicle of claim 1, wherein a distance between the mirror visor and the vehicle body side face is shortest at a vehicle vertical direction central portion of a rear end of the vehicle width direction inner side face of the mirror visor.

* * * * *